No. 675,580. Patented June 4, 1901.
C. W. ADAMS.
CAR FENDER.
(Application filed Jan. 25, 1901.)
(No Model.) 2 Sheets—Sheet 2.
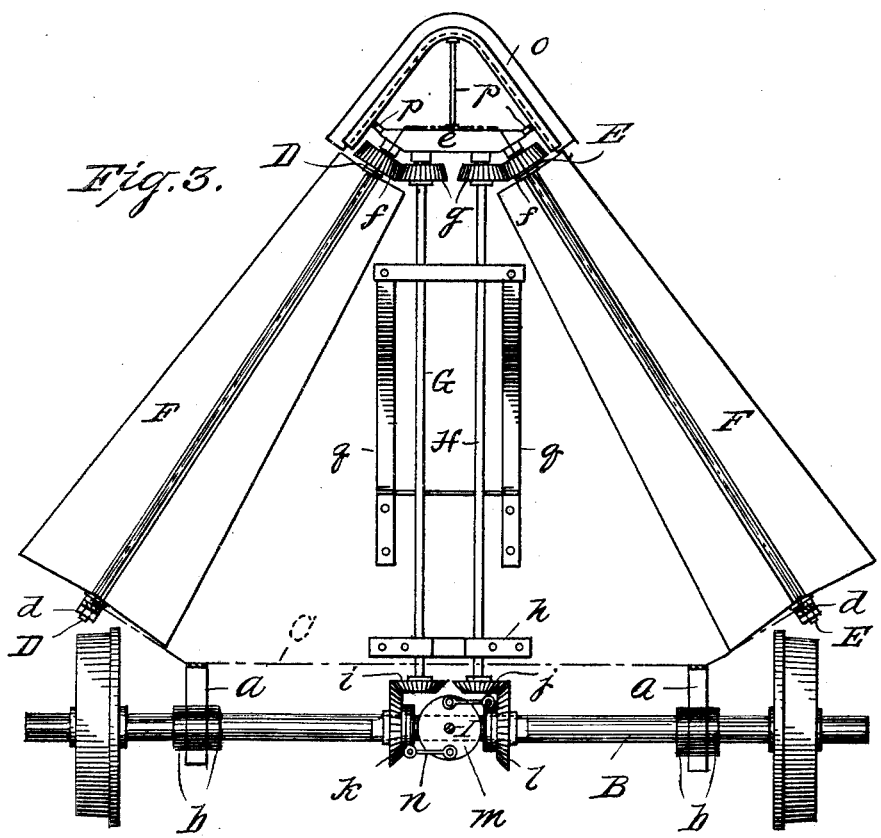
Witnesses:
H. Gerhardt
C. M. Decker
Inventor,
Charles W. Adams,
By
Mark M. Decker
Attorney.

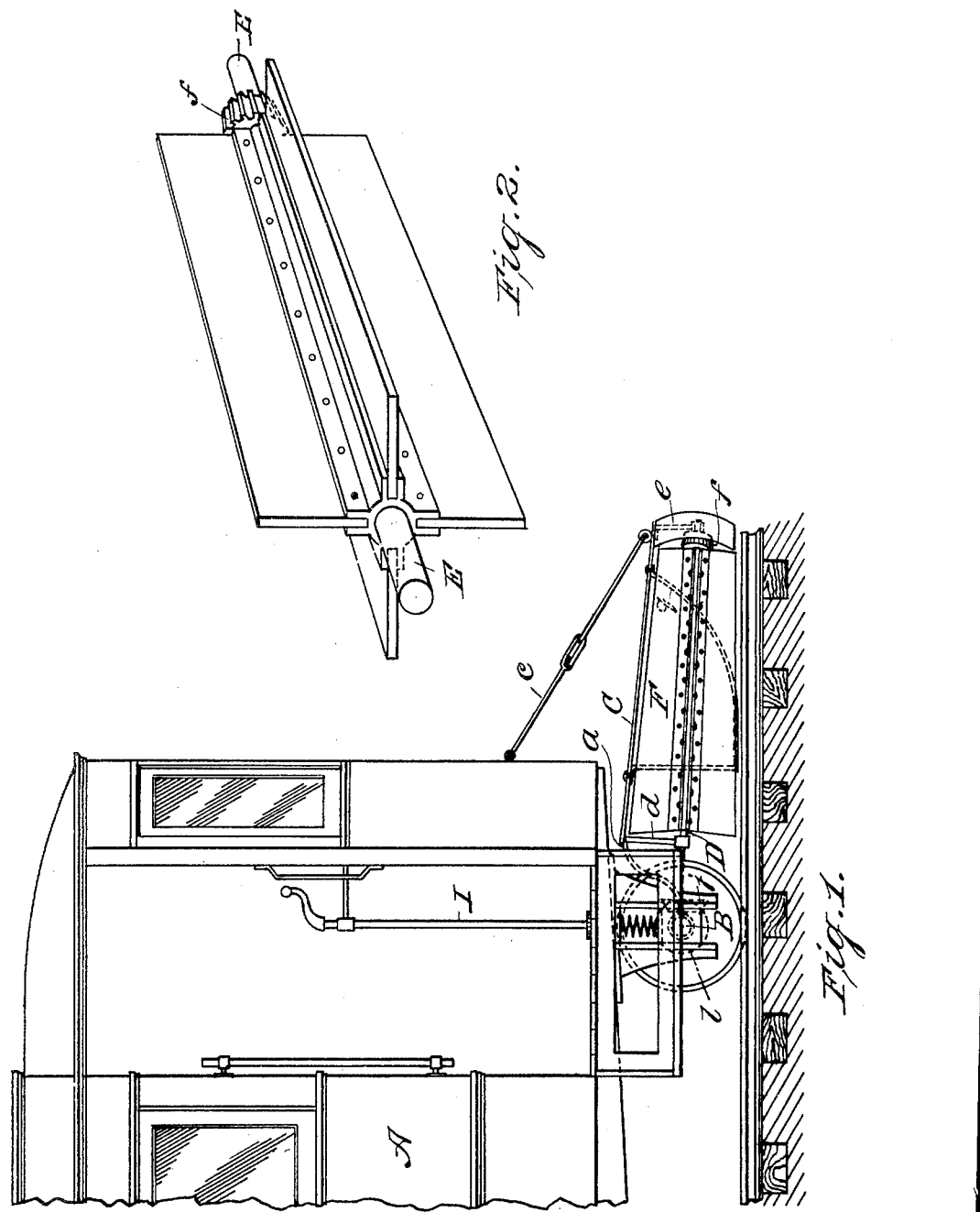

UNITED STATES PATENT OFFICE.

CHARLES W. ADAMS, OF WASHINGTON, PENNSYLVANIA.

CAR-FENDER.

SPECIFICATION forming part of Letters Patent No. 675,580, dated June 4, 1901.

Application filed January 25, 1901. Serial No. 44,656. (No model.)

*To all whom it may concern:*

Be it known that I, CHARLES W. ADAMS, a citizen of the United States, residing at Washington, in the county of Washington and State of Pennsylvania, have invented certain new and useful Improvements in Car-Fenders; and I do hereby declare the following to be a full, clear, and exact description of the invention, such as will enable others skilled in the art to which it appertains to make and use the same.

My invention relates to car-fenders; and the object is to provide a fender which will be simple in construction, efficient in its working, and cheap to manufacture, and beneficial to the public as well. With this object in view I will proceed to describe my invention, reference being had to the accompanying drawings, in which similar letters of reference indicate corresponding parts in the different figures.

In the drawings, Figure 1 is a side elevation of a section of street-car equipped with my improved fender. Fig. 2 is a perspective view in detail of one of the revolving fenders or guards. Fig. 3 is a plan view of the fender proper detached. Fig. 4 is a side elevation in detail of one of the shoes, and Fig. 5 is a transverse sectional view of the buffer.

Referring to the drawings, A indicates a section of car, to which is attached my improved fender, the construction of which is as follows: As shown in the drawings, an auxiliary truck or axle B is employed, to which is connected a frame C. (Indicated in Fig. 3 by dotted lines.) This frame C is connected to or with the axle B by means of straps or hangers $a$, which embrace the axle and are prevented from moving longitudinally thereon by means of collars $b$. The outer end of this frame C is supported by means of a rod $c$, which is formed in two sections, which are linked together, the purpose of which will appear hereinafter.

Secured to the frame C are hangers $d$ and $e$, into which are journaled the ends of the shafts D and E. Upon these shafts are secured the fenders or guards F. Secured on and near the forward or outer ends of these shafts are beveled gears $f$, which mesh with the beveled gears $g$, secured at or near the ends of the main driving-shafts G and H.

These shafts G and H are supported and held in position at the forward end by the journal-box or hanger $e$ and at their opposite end by a hanger $h$. Secured on the rear ends of these shafts G and H are beveled gears $i$ and $j$, which are adapted to mesh with the main driving-gears $k$ and $l$ on the axle B. The gears $k$ and $l$ are adapted to be moved laterally upon said shaft or axle B for the purpose of operating the fender proper. The manner of moving the gears $k$ and $l$ into and out of engagement with the gears $i$ and $j$ is as follows: Secured to the lower extremity of the operating-lever I on the platform of the car is a disk $m$, to which is oppositely connected rods $n$, which in turn are connected to straps which embrace grooved collars or shoulders formed on the gears $k$ and $l$. Directly in front of the journal-box or hanger $e$ is a buffer $o$, which is preferably constructed of semiannular metal bent as shown in Fig. 3 and provided on its face side with rubber (preferably hollow) and secured in place by supports $p$. Secured to the frame C are what I please to term "shoes" $q$, the purpose of which is to prevent the fender proper from catching on the street or track when the car dips or plunges.

The frame may be covered with boards or other suitable material for protecting the mechanism and objects from being thrown therein.

The construction of the guards or fenders is as shown in Fig. 2, the hub being made of metal, into which are secured flexible wings, (preferably rubber,) which if brought into sudden contact with an obstruction will yield and break the force of the blow.

As a modification instead of the gearing shown in the drawings I may substitute a pulley on the axle B and use a transverse shaft with gears on each end and a pulley in the center thereof and connect one pulley with the other by means of a belt and use a clutch attachment for throwing the mechanism in and out of gear, or the device may be geared direct to one of the car-axles.

The operation of my invention is as follows: Fig. 3 shows the device geared ready for use. When the car is started, the axle B will revolve the gears $k$ and $l$, which mesh with the gears $i$ and $j$ on the shafts G and H, which will cause the gears g on the opposite ends of these shafts, which mesh with the gears f, to be revolved, thereby imparting motion to the guards or fenders F, causing them to revolve rapidly, which if brought into contact with a person or other obstruction will push them to one side of the track and away from the car-wheels, thus preventing them from being run over. When it is desired to throw the device out of gear or motion, all that is necessary to be done is for the operator to turn the lever on the car-platform, which will revolve the disk m, which, together with the rods n and other connections, will cause the main driving-gears k and l to be moved laterally on the axle B and out of mesh with the gears i and j, thus stopping the device. When it is desired to start again, the lever is simply turned in the opposite direction, which causes the gears k and l to engage with the gears i and j and revolve the mechanism.

Having described my invention, what I claim is—

1. In a car-fender, the combination with an axle or truck, of a frame connected with said axle or truck, said frame being provided with hangers or journals for supporting the ends of shafts D, E, G and H, and secured on or to said shafts D and E are guards or fenders comprising a longitudinal metallic hub provided with four or more grooves or recesses into which are secured vanes or wings formed of rubber or any other suitable flexible material adapted to be rotated by the means hereinbefore set forth, together with means for throwing the mechanism in or out of gear, substantially as shown and for purposes described.

2. A rotatable fender comprising a longitudinal metallic hub provided with four or more grooves or recesses into which are secured vanes or wings formed of rubber or any other suitable flexible material, substantially as shown and described.

CHARLES W. ADAMS.

Witnesses:
H. GERHARDT,
MARK M. DECKER.